United States Patent [19]

Fegley et al.

[11] 4,049,123

[45] Sept. 20, 1977

[54] METHODS OF AND APPARATUS FOR SORTING ARTICLES IN ACCORDANCE WITH THEIR RESISTIVITY AND THICKNESS

[75] Inventors: Charles R. Fegley, Laureldale; Richard H. Winings, Lawrence; Clifford R. Yeich, Jr., Reading, all of Pa.

[73] Assignee: Western Electric Co., Inc., New York, N.Y.

[21] Appl. No.: 691,804

[22] Filed: June 1, 1976

[51] Int. Cl.$^2$ .......... B65G 47/34

[52] U.S. Cl. .......... 209/74 M; 209/75; 209/81 R

[58] Field of Search .......... 209/74 R, 74 M, 81, 209/82, 75, 73

[56] References Cited

U.S. PATENT DOCUMENTS

| | | | |
|---|---|---|---|
| 3,727,757 | 4/1973 | Boissicat | 209/73 |
| 3,747,753 | 7/1973 | Flint | 209/73 |

*Primary Examiner*—Allen N. Knowles
*Attorney, Agent, or Firm*—R. Y. Peters

[57] ABSTRACT

In making semiconductor devices such as integrated circuits, semiconductor wafers are often sorted according to both their thickness and their resistivity. To so sort the wafers they are moved successively along a first track to a thickness determining device which produces a signal indicative of the thickness of each wafer. This signal is stored by a computer. Continued successive movement of the wafers brings them to a resistivity determining device. This device, which is rendered effective by the stored thickness signal, produces a signal indicative of the resistivity of each wafer. The resistivity signal is stored by the computer. The successive movement of the wafers is continued along the first track to move them onto a second track. Each article is moved successively along the second track. And, in response to the stored signals, each article is moved into a preselected position associated with both the thickness and the resistivity of each article.

13 Claims, 8 Drawing Figures

METHODS OF AND APPARATUS FOR SORTING ARTICLES IN ACCORDANCE WITH THEIR RESISTIVITY AND THICKNESS

BACKGROUND OF THE INVENTION

1. Field of the Invention

This invention relates to methods of and apparatus for sorting articles in accordance with both their thickness and resistivity. More particularly, this invention relates to methods of and apparatus for sorting semiconductor wafers in accordance with both their thickness and resistivity, wherein a pivotally mounted transitional track is provided for moving the wafers from a first track to a second track while a receiving position along the second track is activated by stored signals indicative of both the thickness and the resistivity of the wafers.

2. Description of the Prior Art

In the manufacture of electronic components such as integrated circuits, it is necessary for a number of different reasons to control both the thickness and the resistivity of semiconductor wafers used as substrates for the components. For example, it is necessary to control the thickness to make certain that the wafers have adequate strength to reduce breakage in the various wafer processing steps. It is also necessary to control the thickness in the manufacture of those components where impurity diffusion is carried out from both sides of the wafer, such as in the manufacture of silicon rectifiers. Another reason for controlling thickness is to make certain that excessive wafer material is not being needlessly and uneconomically used. In addition, by controlling the thickness of the wafers, large lots of wafers can be processed simultaneously through process operations where variations in thickness beyond a predetermined amount could cause anomalous failure of the process lot. Examples of these process operations are mechanical polishing, chemical polishing and photolithography.

In the manufacture of electronic components, it is also important to control the resistivity of the wafers for a number of reasons. For example, control of resistivity is required for the preparation of electrically isolated portions of wafers in the manufacture of integrated circuits. Also, since resistivity has a bearing on the depth to which impurities may be diffused and a bearing on the concentration gradient of the diffused impurities, it is necessary to control the resistivity of the wafers for these reasons.

In the past, thickness and resistivity have been determined separately and this has resulted in excessive handling of the wafers, with a consequent increase of sorting time and error, and of damage to the wafers. Also, in order to check resistivity, thickness had to be first obtained and the resistivity instrumentation has to then be manually adjusted in accordance with the thickness.

Accordingly, it is advantageous to sort the wafers automatically in accordance with both their thickness and resistivity. It is also desirable at the same time to decrease the possibility of damage to the wafers, and to decrease the sorting time and error.

It is also advantageous to sort the wafers using a simple and efficient apparatus which does not damage the wafers. For example, it is advantageous to use a gravity feed track and locate receiving stations along this track to eliminate the use of more costly air bearing tracks. This gravity feed arrangement also offers the advantage of compactness and reduces floor space requirements.

SUMMARY OF THE INVENTION

It is, therefore, an object of this invention to provide new and improved methods of said apparatus for sorting articles in accordance with their resistivity and thickness.

A further object of this invention is to provide methods of and apparatus for sorting semiconductor wafers in accordance with both their thickness and resistivity, wherein a pivotally mounted transitional track is provided for moving the wafers from a first track to a second track while a receiving position along the second track is activated by stored signals indicative of both the thickness and the resistivity of the wafers.

Another object of this invention is the provision of a method of and apparatus for sorting articles, wherein the articles are moved successively onto a transitional track for holding each article, and a receiving means positioned along another track is activated by stored signals indicative of a characteristic of each article while each article is so held.

With these and other objects in view, the present invention contemplates a new method of sorting articles which includes the steps of moving the articles successively along a first track to a thickness determining device and producing a signal from this device indicative of the thickness of each article. This signal is then stored, and a resistivity determining device is rendered effective in response to this signal. The articles are then moved successively along the track to a resistivity determining device where a signal is produced indicative of the resistivity of each article. This signal is also stored, and the articles are moved sucessively along the first track onto a second track. The articles are then moved successively along the second track into a preselected position associated with both the thickness and resistivity of each article.

This invention also contemplates an apparatus for sorting articles, which includes a device for producing a signal indicative of the thickness of each article and another device responsive to the thickness signal for producing a signal indicative of the resistivity of each article. First track facilities are provided for moving successively each article to the thickness determining device to produce the thickness signal and then to the resistivity determining device to produce the resistivity signal. A device is provided for storing these signals. Second track facilities are provided for moving successively each article into a receiving position selected by the storing device and associated with both the thickness and resistivity of each article. Additional facilities are provided for moving each article from the first track facilities to the second track facilities in response to the stored signals into one of the positions of the second track means.

BRIEF DESCRIPTION OF THE DRAWING

Other objects and advantages of the present invention may be more clearly understood by reference to the following detailed description and drawing wherein.

DETAILED DESCRIPTION

Figure 1:
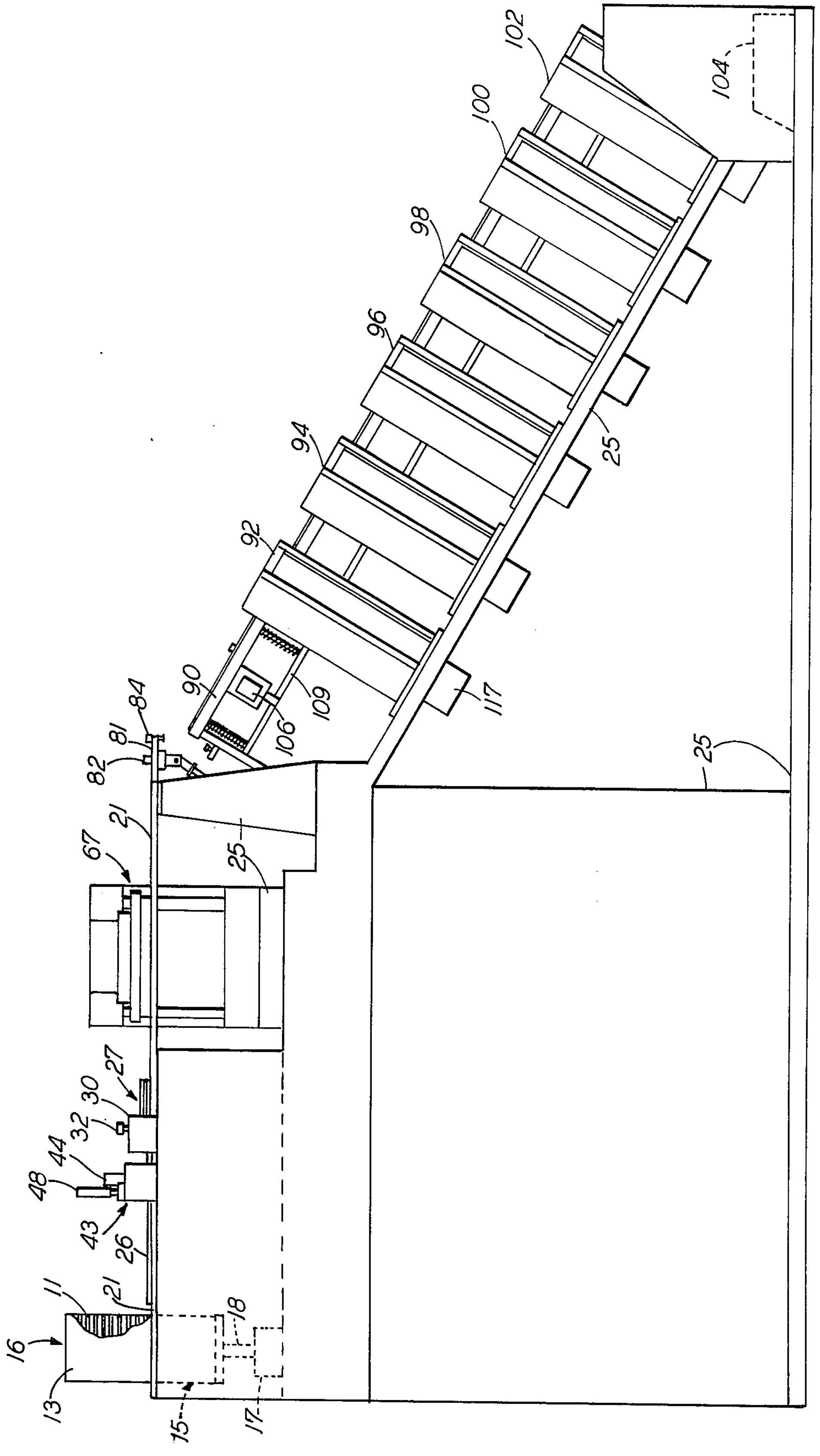
FIG. 1 is a side elevational view of the overall apparatus of the present invention for automatically sorting articles, such as semiconductor wafers or the like, in accordance with their thickness and resistivity, and shows an air bearing track, a pivotal track and an inclined gravity-feed track.

Referring now to the drawing and in particular to FIG. 1, an apparatus of the present invention is shown for sorting articles, such as semiconductor wafers 11, in accordance with both their thickness and resistivity. The wafers 11 along with a portion of the apparatus are shown enlarged in FIG. 2. The wafers 11 to be sorted are slidably positioned in a plurality of vertically spaced grooves 12 (FIG. 2) of a conventional, portable wafer magazine or carrier 13, one wafer 11 to each groove 12.

Wafer Feed Station

Figures 2, 3:
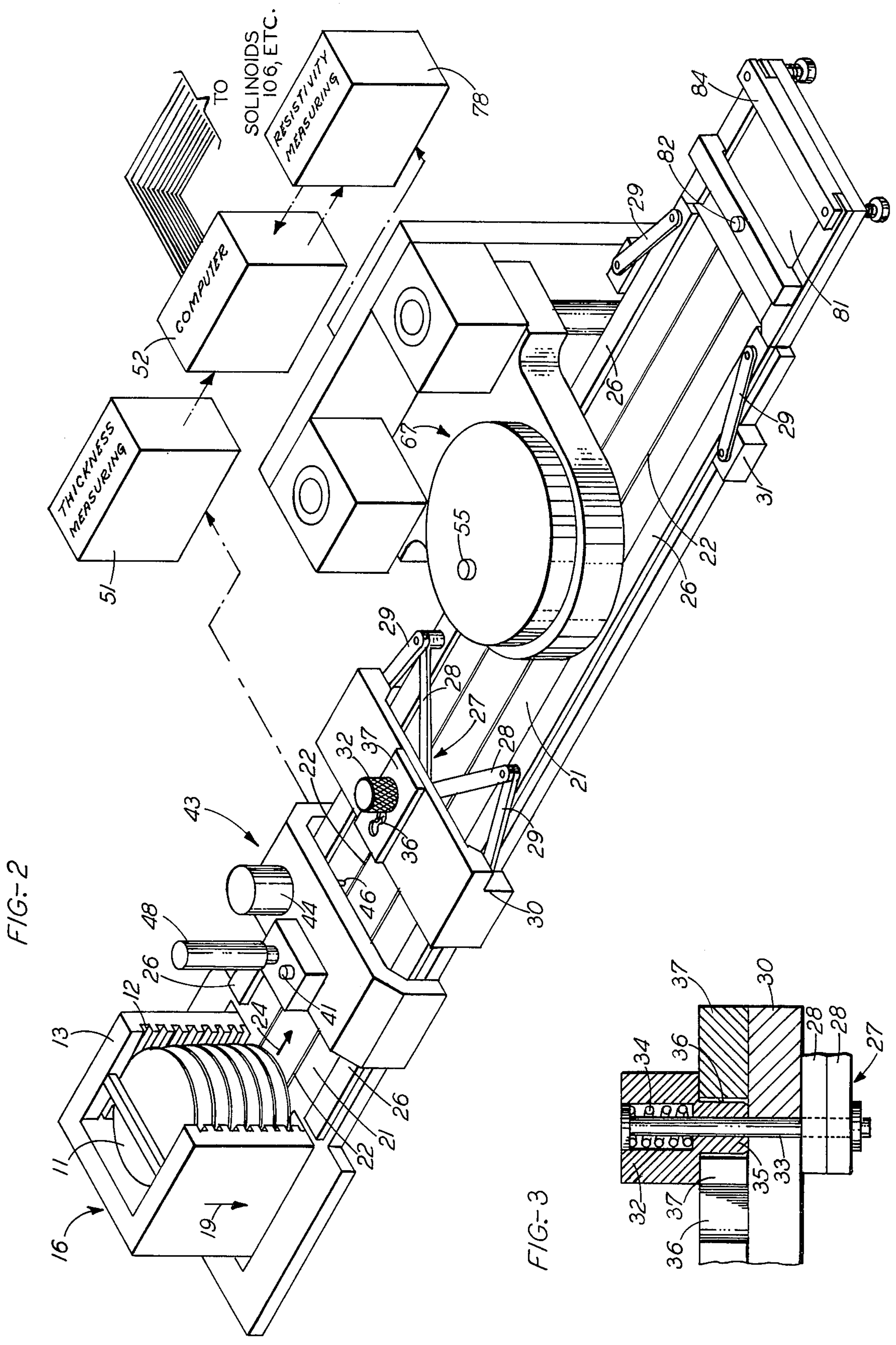
FIG. 2 is a perspective view of a portion of the apparatus of FIG. 1, showing a wafer feed station, a thickness measuring station and a resistivity measuring station, all located along the air bearing track.
FIG. 3 is a side elevational view, partly cut away and in section, of a mechanism for adjusting laterally guide rails of air bearing track of FIG. 2.

The carrier 13 with the wafers 11 therein is removably mounted by an operator on an elevator mechanism, designated generally by the numeral 15 (FIG. 1), at a wafer feed station 16 (FIGS. 1 and 2). The mechanism 15 includes an indexing motor 17 (FIG. 1) and a feed screw 18 that cooperate to move the carrier 13 downwardly in the direction of arrow 19 (FIG. 2) to position successively each wafer 11 adjacent to a horizontal air bearing track 21. Air jets from slots 22 in the track 21 remove successively each wafer 11 from the grooves 12 of the carrier 13 and transport such wafer 11 along the track 21 in the direction shown by the arrow 24.

The elevator mechanism 15 and air bearing track 21 are suitably supported by a base 25 (FIG. 1).

As an alternative, a solenoid or air cylinder (neither shown) may be used to assist in the removal of the wafers 11 from the grooves 12 of the carrier 13.

A suitable elevator mechanism and an air bearing track, which are commercially available from GCA Corporation, are shown and described in Lasch, Jr. et al. U.S. Pat. No. 3,645,581, and reference may be had to this patent for more structural and operational details of these types of facilities.

In accordance with the present invention, the track 21 is provided with a pair of retaining guide rails 26 (FIG. 2) which are laterally slidable on the upper surface of the track 21 to vary the width of the track 21 to accommodate wafers 11 of different diameters. A linkage mechanism, designated generally by the numeral 27, provides lateral adjustment for the guide rails 26 while maintaining them parallel to each other and equidistant from the sides of the track 21. The mechanism 27 has internal links 28 pivotally mounted to the guide rails 26, as shown in FIG. 2. External links 29 of the mechanism 27 are also pivotally mounted to the guide rails 26, and, in addition, are pivotally mounted to a bridging support 30 and a block support 31.

A knob 32 (FIGS. 2 and 3) for controlling the linkage mechanism 27 is slidably mounted to a pin 33 and movably mounted to internal links 28 of the linkage mechanism 27. The knob 32 is pullable by the operator against a compression spring 34 to position a detent 35, formed as a part of the knob 32, into one of a plurality of spaced holes 36 in an index plate 37 fixed to the bridging support 30. By so positioning the detent 35, the guide rails 26 are moved or slid laterally to accommodate wafers 11 having different diameters, for example $1\frac{1}{2}$, 2 or 3 inches. Each hole 36 corresponds to a wafer 11 having a different diameter.

Thickness Measuring Station

As each wafer 11 moves successively along the track 21 in the direction of the arrow 24 (FIG. 2), it passes, and activates, a photosensor 41 of a wafer thickness measuring station, designated generally by the numeral 43. Activation of the photosensor 41 energizes a solenoid 44 to move a pin 46 against the track 21. This stops the wafer 11 under a probe 48 of a conventional thickness measuring instrument 51, such as that sold by Ade Corporation under the designation "Microsense 3046A." The instrument 51 then measures the thickness of the wafer 11 and produces a signal indicative of such thickness which is fed into a computer 52 which stores the signal.

It is to be understood that for wafers 11 of different diameters, pins 46 in different predetermined locations would be used to stop such wafers 11.

The computer 52 may be a "minicomputer" or a programmable calculator such as that sold by the Hewlett-Packard Co. under the designation "HP-9820," and, as a matter of convenience using a code, designated "ASCII." Other standard Hewlett-Packard components for interfacing the computer 52 with the apparatus of the present invention include a power supply, sold under the designation "HP-6940A;" a multiprogrammer, sold under the designation "HP-6940A;" an ASCII to parallel converter, sold under the designation "HP-59301A;" interface devices sold under the designations "HP-11202A" and "HP-11144A." These components are interconnected in a conventional manner to control the apparatus of the present invention, and are included as a part of the computer 52 in the block diagram portion of FIG. 2.

After the thickness of the wafer 11 is measured at the thickness measuring station 43, the solenoid 44 is de-energized by appropriate circuitry (not shown) to move the pin 46 away from the track 21 to release the wafer 11 from beneath the probe 48. Upon release, the air jets from the slots 22 continue to move the wafer 11 along the track 21 in the direction shown by the arrow 24.

Resistivity Measuring Station

Figure 4:
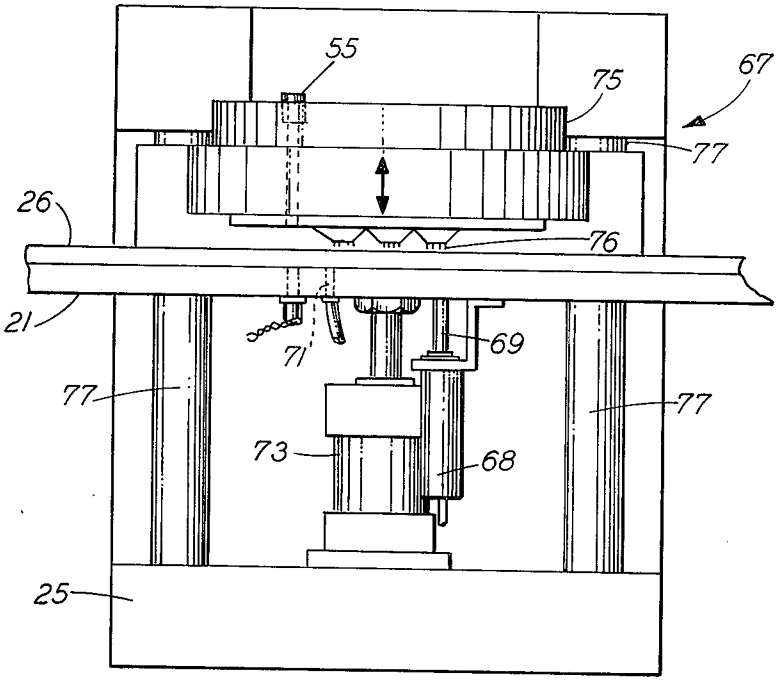
FIG. 4 is a side elevational view of a portion of the apparatus of FIGS. 1 and 2, showing the resistivity measuring station and its probe contacts.

Next, the wafer 11 moving along the track 21 passes beneath, and activates, a photosensor 55 at a resistivity measuring station, designated generally by the numeral 67 (FIG. 2). Activation of the photosensor 55 energizes a solenoid 68 (FIG. 4) to extend a pin 69 above the surface of the track 21 to stop the wafer 11. Activation of the photosensor 55 also produces a vacuum at an aperture 71 in the track 21 to hold securely the wafer 11 and prevent its movement.

In addition, activation of the photosensor 55 operates an air cylinder 73 to lower a test head 75 and to engage its probe contacts 76 with the wafer 11. Rods 77 guide the test head 75 as it is lowered. The probe contacts 76 typically include four sets of four pins or contacts each, and may be any of those commercially available for measuring resistivity of semiconductor wafers, such as those manufactured by A. M. Fell of England and sold by Kulicke and Soffa Industries Co., Inc. under the designation "Fell."

Engagement of the probe contacts 75 with the wafer 11 results in a signal which is fed into a resistivity measuring instrument 78, such as that sold by Self-Organizing Systems, Inc. under the designation "T-919 Resistivity Test Set." Since the resistivity of the wafer 11 is a functon of its thickness, the signal indicative of thickness is fed from the computer 52 to the resistivity measuring instrument 78 to render it effective for making resistivity measurements. A signal indicative of the resistivity of the wafer 11 is then fed from the resistivity measuring instrument 78 to the computer 52 which stores the signal.

Next, the solenoid 68 is de-energized by appropriate circuitry (not shown) to retract the pin 69 beneath the surface of the track 21 and to terminate the vacuum at the aperture 71. This releases the wafer 11 from the resistivity measuring station 67.

Pivotal Track

The wafer 11 then continues to move along the track 21 to a pivotal transitional track 81 (FIGS. 2, 5 and 6), beneath a photosensor 82 and into contact with a closed gate 84 that stops the wafer 11. At this time the pivotal track 81 is in the same plane as the track 21, as shown in FIGS. 2 and 5.

The presence of the wafer 11 beneath the photosensor 82 activates it to energize an air cylinder 85 (FIG. 5) to pivotly move the track 81 downwardly. This pivotal movement results in the engagement of movable pins 86, normally biased by compression springs 87 to close such gate 84, against stops 88 to force upwardly or open the gate 84, and against a stop 89 to terminate the movement of the track 81.

Inclined Track and Receiving Carriers

Figure 5:
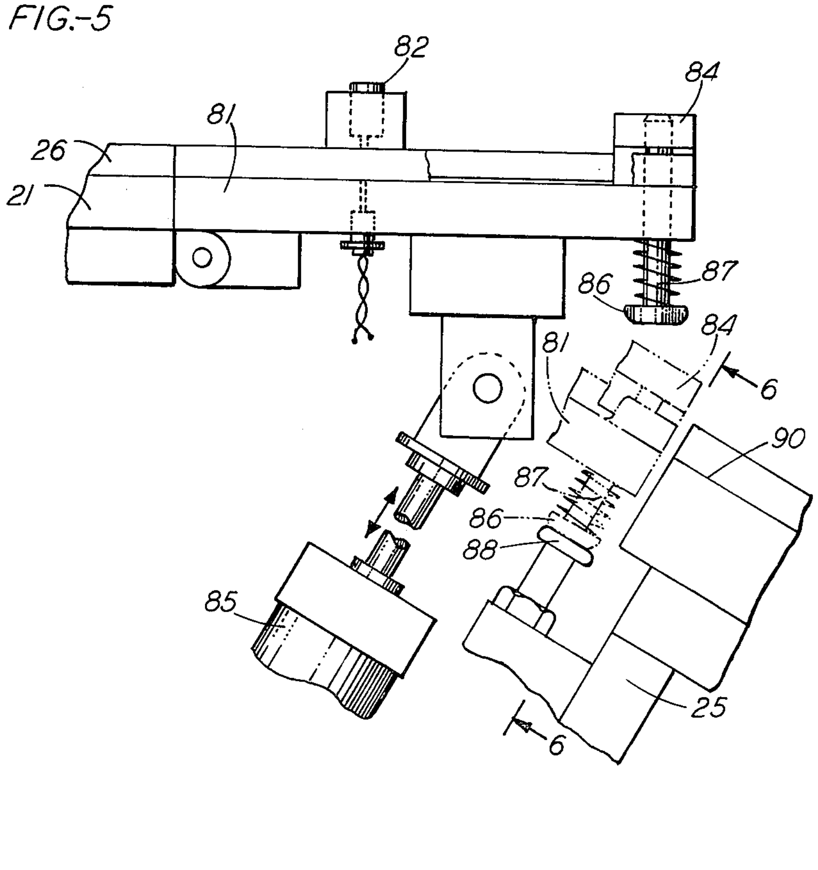
FIG. 5 is a side elevational view of a portion of the apparatus of FIGS. 1 and 2, showing the pivotal track and its relationship to the air bearing track and the inclined gravity-feed track.
Figure 6:
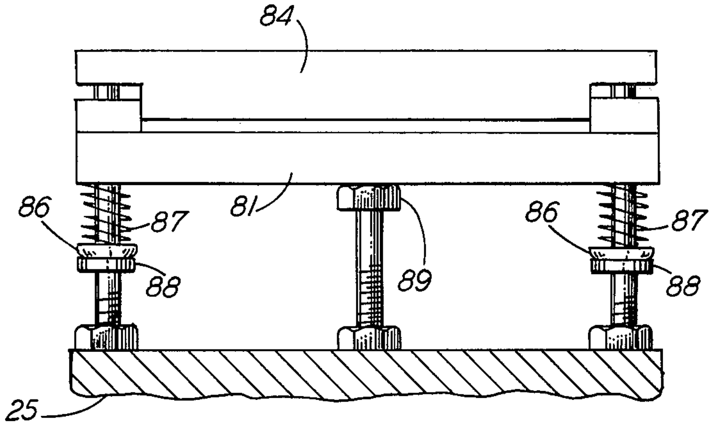
FIG. 6 is an end view of the pivotal track of FIG. 5, taken along lines 6—6 of FIG. 5, showing the manner in which various stops cooperate to open a gate after the pivotal track has been moved to its lowermost position in the plane of the inclined track.
Figure 7:
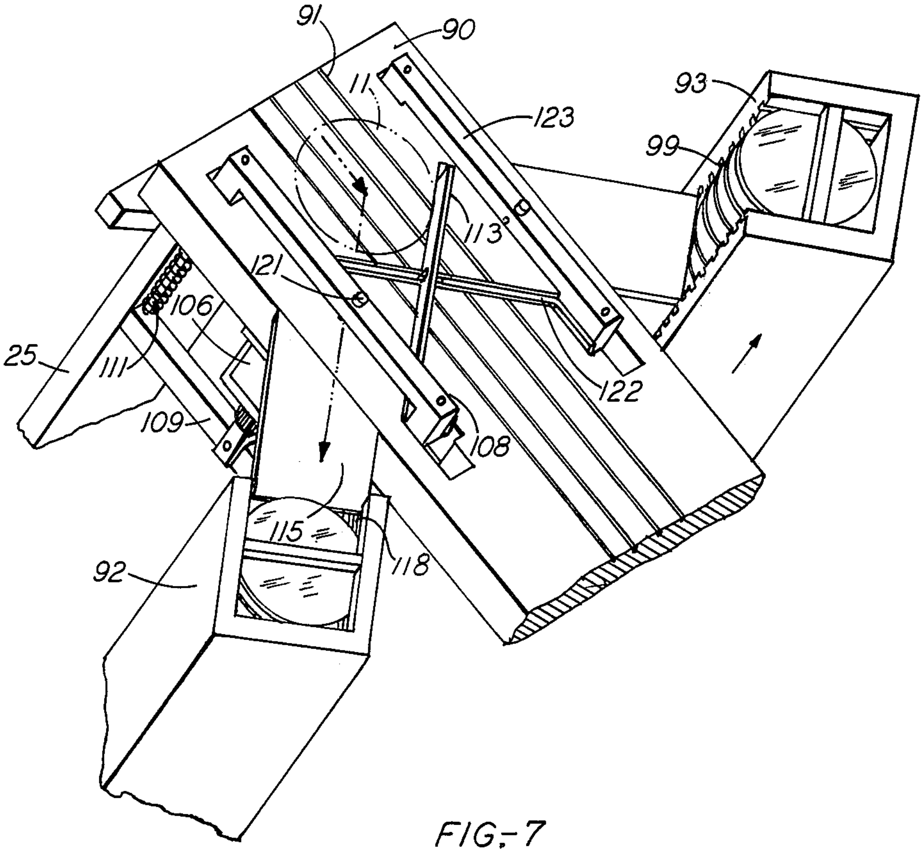
FIG. 7 is a perspective view of a portion of the inclined gravity-feed track of FIG. 1, showing the manner in which a wafer may be fed to either one of a pair of receiving carriers.

The downward pivotal movement of the track 81 also positions it in the plane of an inclined gravity-feed track 90, as shown in FIGS. 5 and 7, that slopes downwardly from the horizontal track 21 by approximately 30°. The pivotal track 81 and its gate 84 prevent the wafer 11 from flying off the track 21 in making the transistion from the horizontal track 21 to the inclined track 90, and thereby prevents damage to the wafer 11 in making this transition.

The opening of the gate 84, as shown in FIG. 5 releases the wafer 11 from the track 81 and moves it under the force of gravity along the inclined track 90. For economy and compactness, the track 90 does not include air bearing expedients but instead is inclined and relies on gravity to move the wafer 11 therealong. To reduce the friction between the wafer 11 and the track 90, the upper surface of the track may be provided with a plurality of parallel, friction-reducing strips 91 (FIG. 7) formed of a material such as that sold under the trademark "Teflon."

After the wafer 11 moves from the pivotal track 81, appropriate timing circuitry (not shown) activates the air cylinder 85 to move upwardly the track 81 to its initial position in the plane of the track 21. This also permits the springs 87 to close the gate 84 in preparation for the sorting of the next wafer 11.

Figure 8:
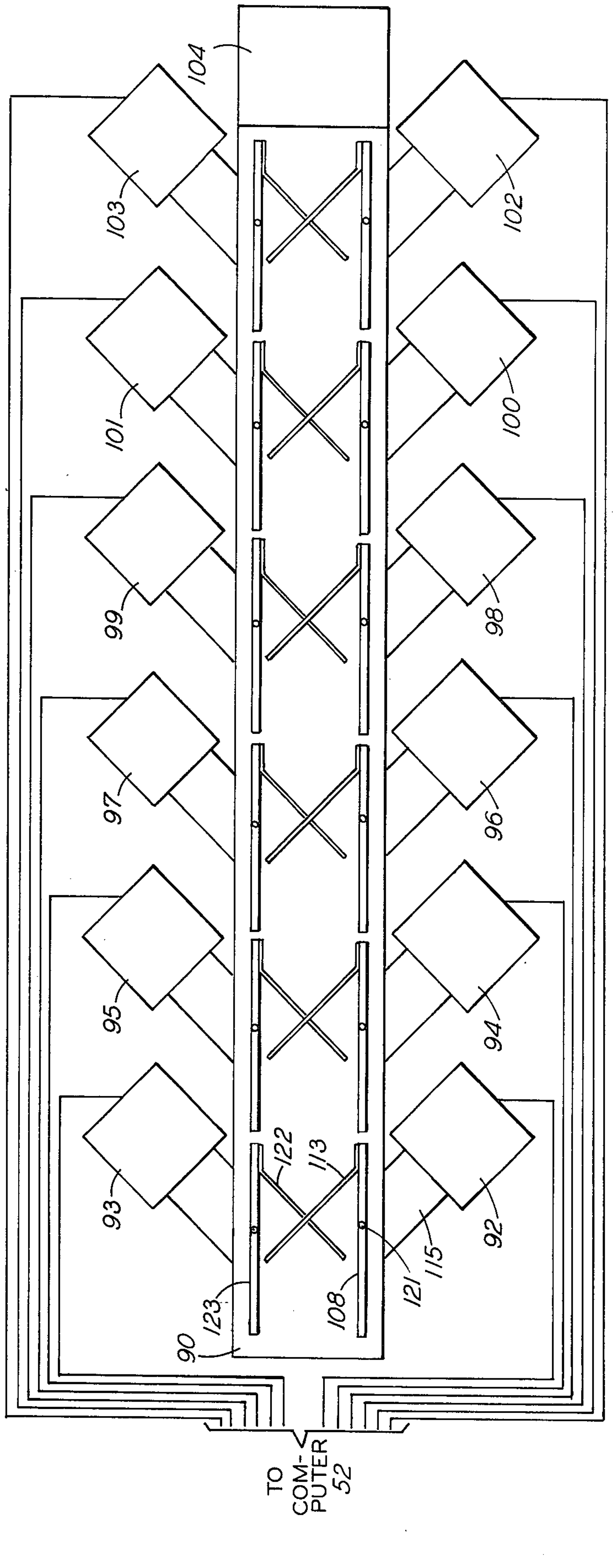
FIG. 8 is a plan view of the inclined gravity-feed track of FIG. 1, showing the manner in which a wafer may be fed to any one of a plurality of different receiving carriers or to a receiving bin.

From the track 90 the wafer 11 is fed to any one of a plurality of receiving carriers, designated 92 through 103, inclusive, in FIGS. 1, 7 and 8, or to a receiving bin 104 (FIGS. 1 and 8), the particular carrier 92-103 or bin 104 being selected by the signals indicative of thickness and resistivity that have been stored in the computer 52. It is during the time that the wafer 11 is stopped by the gate 84 that the proper receiving carrier 92-103 or bin 104 is selected by the computer 52.

This selective operation is brought about by feeding a control signal from the computer 52 to any one of a plurality of solenoids, one of which is shown in FIGS. 1 and 7 and is designated by the numeral 106. Assuming for explanatory purposes that the control signal operates the solenoid 106 (FIG. 7), it moves a gate 108 upwardly above the surface of the track 90 through a support arm 109 and pins 111 that are spring-biased to normally close the gate 108.

The gate 108 has fixed to it an inclined guide 113, which is normally beneath the surface of the track 90, and the upward movement of the gate 108, therefore results in the upward movement of such guide 113. This upward movement of the gate 108 opens it and permits the wafer 11 to move under the influence of gravity along the guide 113, over a feed track 115 into the receiving carrier 92. The carrier 92 is indexed by a conventional elevator mechanism 117 (FIG. 1) to receive one wafer 11 into each groove 118 in the carrier 92. Structural and operational details of suitable facilities for use as the mechanism 117 and carrier 92 are shown and described in the aforementioned Lasch, Jr. patent.

Additional details of the sorting aspects of the present invention will now be described with reference to FIG. 8 and to a specific example. While only the twelve receiving carriers 92-103 and the bin 104 are shown in FIG. 8, it is, of course, to be understood that any number of receiving carriers and bins may be used, the number of arrangement depending on the categories into which the wafer 11 are to be sorted.

In the specific example, the computer 52 is programmed to sort the wafers 11 as follows:

If each wafer 11 is outside of a desired thickness range, e.g., 20 to 21 mils, no resistivity check is made on the wafer 11 and it is conveyed by the apparatus of the present invention into the carriers 102 and 103. More specifically, if the thickness is too low, e.g., below 20 mils, the wafer 11 is conveyed into the carrier 102, and if the thickness is too high, e.g., above 21 mils, it is conveyed into the carrier 103.

On the other hand, if the wafers 11 are outside of a desired resistivity range, e.g., 4 to 8 ohm-cm, they are simply conveyed to the bin 104 even though their thickness may be within the desired range.

Further, if the wafer 11 is within the desired range of thickness, e.g., 20 to 21 mils, and within the desired range of resistivity, e.g., 4 to 8 ohm-cm, the wafers 11 are sorted by thickness in increments of, e.g., 0.1 mils, into the other receiving carriers 92-101.

In the aforementioned specific example, if it is assumed that the wafer 11 has a range of resistivity of 4 to 8 ohm-cm and a thickness of 20.1 mils, it is conveyed into the carrier 92. As the wafer 11 passes beneath the gate 108, it activates a photosensor 121 that de-energizes the solenoid 106 to close the gate 108 and retract the guide 113 beneath the track 89. This prepares the apparatus of the present invention for sorting the next wafer 11 that has been removed from the carrier 13 by the elevator mechanism 15 and air bearing track 21.

A guide 122 is fixed to a gate 123 associated with the carrier 93 which is opposite the carrier 92. It should be noted that the guide 122 is appropriately notched to provide adequate clearance for the guide 113. Accordingly, both the guides 113 and 122 operate independently of each other and with the gates 108 and 123 to which they are fixed.

When the carrier 13 is empty, an appropriate indicator (not shown) is energized, and the operator replaces it with a full carrier 13 of wafers 11 to be sorted. Also, when the receiving carriers 92-103 are full, an appropriate indicator (not shown) is energized, and the operator replaces them with empty carriers 92-103.

In the event it is desired to sort the wafers 11 precisely in accordance with their resistivity instead of their thickness, the computer 52 may be programmed to operate the receiving carriers 92-103 to accept the wafers 11 of predetermined resistivity, if their thicknesses lie within a predetermined range.

It is to be understood that the above-described arrangements are simply illustrative of the application of the principles of the invention. Numerous other arrangements may be readily devised by those skilled in the art which embody the principles of the invention and fall within the spirit and scope.

What is claimed is:

1. A method of sorting articles, which comprises the steps of:
- moving the articles successively along a first track to a thickness determining device;
- producing a signal from said thickness determining device indicative of the thickness of each article;
- storing said thickness signal;
- rendering effective a resistivity determining device in response to the stored thickness signal;
- continuing to move the articles successively along the track and to the resistivity determining device;
- producing a signal from said resistivity determining device indicative of the resistivity of each article;
- storing said resistivity signal;
- continuing to move each article successively along the first track onto a second track; and
- moving each article in response to said stored signals successively along the second track into a preselected position associated with both the thickness and resistivity of each article.

2. The method of claim 1, wherein the first track has longitudinally extending rails on each side of the track for guiding the articles along the track, and wherein the method comprises the additional step of: adjusting the rails to accommodate the diameters of the articles to be sorted prior to moving the articles along the track.

3. The method of claim 1, comprising the additional steps of:
- moving each article successively along the first track onto a transitional track joining the first track to hold each article; and
- pivoting the transitional track to release successively each article onto the second track.

4. The method of claim 3, wherein the transitional track has a normally closed gate located transversely along the track for stopping each article as it engages the gate, and wherein the method comprises the additional step of: opening the gate after the transitional track is pivoted to join it with the second track.

5. The method of claim 1, wherein a movable gate and a guide fixed to the gate are associated with each position along the second track, and wherein the method comprises the additional step of operating each gate and its guide in accordance with both the thickness and the resistivity signals to open the gate and extend the guide beyond the upper surface of the second track to feed each article into a receiving position associated with the thickness and resistivity of each article.

6. A method of sorting articles, which comprises the steps of:
- moving the articles successively along a first track to a device for determining a characteristic of each article;
- producing a signal from said device indicative of such characteristic of the article;
- storing said signal;
- continuing to move the article successively along the track onto a transitional track to hold each article;
- activating an article receiving means positioned along a second track while the article is held by the transitional track; and
- pivoting the transitional track to release the held article onto the second track and into the activated receiving means.

7. A method of sorting articles, which comprises the steps of:
- moving the articles successively along an air bearing track to a thickness determining device;
- producing a signal from said thickness determining device indicative of the thickness of each article;
- storing said thickness signal;
- rendering effective a resistivity determining device in response to the stored thickness signal;
- continuing to move the articles successively along the track and to the resistivity determining device;
- producing a signal from said resistivity determining device indicative of the resistivity of each article;
- storing said resistivity signal;
- continuing to move each article successively along the air bearing track onto a transitional track joining the track to hold each article;
- activating in response to said stored signals an article receiving means positioned along an inclined track located at an angle with the air bearing track and associated with both the thickness and resistivity of each article;
- pivoting the transitional track to release successively each article onto the inclined track; and
- moving each article successively along the inclined track into the activated article receiving means to thereby sort the articles.

8. An apparatus for sorting articles, which comprises:
- thickness determining means for producing a signal indicative of the thickness of each article;
- resistivity determining means responsive to said thickness signal for producing a signal indicative of the resistivity of each article;
- first track means for moving successively each article to the thickness determining means to produce said thickness signal and then to the resistivity determining means to produce said resistivity signal;

means for storing said thickness and resistivity signals;

second track means for moving successively each article into a receiving position selected by the storing means and associated with both the thickness and the resistivity of each article; and means for moving each article from the first track means to the second track means, and in response to said stored signals into one of the positions of the second track means.

9. The apparatus of claim 8, further comprising:

longitudinally extending rails at each side of the track means for guiding the articles along the track means; and means for adjusting the rails to accommodate the diameters of the articles to be sorted.

10. The apparatus of claim 8, wherein the means for moving each article from the first track means to the second track means is a transitional track pivotally mounted at one end of the first track, and wherein the apparatus further comprises means for pivoting the transitional track to release successively each article onto the second track means.

11. The apparatus of claim 10, further comprising a normally closed gate located at the end of the transitional track opposite to the end that is pivotally mounted to the first track means, the gate being mounted for stopping each article as it engages the gate, wherein the apparatus further comprises means for opening the gate after the transitional track is pivoted to join it with the second track means.

12. The apparatus of claim 8, further comprising:

a movable gate and a guide fixed to the gate, the gate and guide being associated with each position along the second track means; and means for operating each gate and its guide in accordance with both the stored thickness and resistivity signals to open the gate and extend the guide beyond the upper surfaces of the second track to feed each article into the receiving position.

13. An apparatus for sorting articles, which comprises:

means for producing a signal indicative of a characteristic of each article;

means for moving the articles successively along a first track to said means to produce said signal;

means for storing said signal;

means for continuing to move the articles successively along the first track onto a transitional track to hold each article;

means for activating an article receiving means positioned along a second track in accordance with said stored signal while the article is held by the transitional track; and means for pivoting the transitional track to release each held article onto the second track into the activated receiving means to thereby sort the articles.

* * * * *